United States Patent
Harima et al.

(10) Patent No.: US 12,002,998 B2
(45) Date of Patent: Jun. 4, 2024

(54) SECONDARY BATTERY

(71) Applicant: Prime Planet Energy & Solutions, Inc., Tokyo (JP)

(72) Inventors: Yukio Harima, Hirakata (JP); Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/585,564

(22) Filed: Jan. 27, 2022

(65) Prior Publication Data

US 2022/0238967 A1 Jul. 28, 2022

(30) Foreign Application Priority Data

Jan. 28, 2021 (JP) ................. 2021-011567

(51) Int. Cl.
*H01M 50/538* (2021.01)
*H01M 50/186* (2021.01)

(52) U.S. Cl.
CPC ....... *H01M 50/538* (2021.01); *H01M 50/186* (2021.01)

(58) Field of Classification Search
CPC .................. H01M 50/538; H01M 50/186
See application file for complete search history.

(56) References Cited

U.S. PATENT DOCUMENTS

| | | | |
|---|---|---|---|
| 2011/0104528 A1 | 5/2011 | Byun et al. | |
| 2016/0336576 A1 | 11/2016 | Shinoda et al. | |
| 2017/0125778 A1* | 5/2017 | Iwasa | H01M 50/533 |
| 2017/0214030 A1* | 7/2017 | Tsutsumi | H01M 50/55 |
| 2018/0069226 A1 | 3/2018 | Waki et al. | |
| 2019/0221819 A1 | 7/2019 | Xing et al. | |
| 2019/0312253 A1* | 10/2019 | Wakimoto | H01M 50/103 |
| 2020/0251787 A1* | 8/2020 | Shinoda | H01M 10/0587 |
| 2020/0343559 A1 | 10/2020 | Li et al. | |
| 2022/0352606 A1 | 11/2022 | Wakimoto et al. | |
| 2022/0384915 A1 | 12/2022 | Murata et al. | |

FOREIGN PATENT DOCUMENTS

| | | |
|---|---|---|
| CN | 108598353 A | 9/2018 |
| JP | 2015141847 A | 8/2015 |
| JP | 2017-50069 A | 3/2017 |
| JP | 2018-22696 A | 2/2018 |
| JP | 2019-61779 A | 4/2019 |
| WO | WO2015159433 A1 | 4/2017 |
| WO | 2019088053 A1 | 5/2019 |
| WO | 2020215919 A1 | 10/2020 |
| WO | 2021060009 A1 | 4/2021 |
| WO | 2021124796 A1 | 6/2021 |

* cited by examiner

*Primary Examiner* — Christopher P Domone
*Assistant Examiner* — Jonathan William Estes
(74) *Attorney, Agent, or Firm* — HAUPTMAN HAM, LLP (57) ABSTRACT

A technology is provided which suppresses the movement of an electrode body inside of a battery case, and prevents the damage at a junction between an electrode tab group and a collector. A secondary battery herein disclosed includes an exterior body, a sealing plate, an electrode body, an electrode tab group, a terminal, and a collector. The collector has a first region part to be joined with the electrode tab group, a second region part to be joined with the terminal, and a third region part closer to the electrode body than the first region part.

10 Claims, 8 Drawing Sheets

SECONDARY BATTERY

CROSS REFERENCE TO RELATED APPLICATIONS

The present application claims the priority based on Japanese Patent Application No. 2021-011567 filed on Jan. 28, 2021, entire contents of which are incorporated by reference in the present specification.

BACKGROUND OF THE DISCLOSURE

1. Technical Field

The present invention relates to a secondary battery.

2. Background

A secondary battery such as a lithium ion secondary battery generally has a configuration in which an electrode body accommodated in a battery case and a terminal exposed to outside of the battery case are electrically connected with each other. A secondary battery with such a configuration includes, for example, an electrode body having a first electrode sheet, and a second electrode sheet having a different polarity from that of the first electrode sheet, an exterior body having an opening, and for accommodating the electrode body therein, a sealing plate for sealing the opening of the exterior body, a terminal electrically connected with the electrode sheet in the inside of the exterior body, and extending from the sealing plate to the outside of the exterior body, and a collector electrically connected with the terminal and the electrode body. For example, the electrode body of this kind of secondary battery is provided with electrode tab groups each including a plurality of collecting electrode tabs (a positive electrode tab group and a negative electrode tab group), so that the electrode body and the terminal can be connected with each other via the electrode tab groups and the collector.

One example of the secondary battery with the foregoing configuration is shown in Japanese Patent Application Publication No. 2015-141847. In such a secondary battery disclosed in this patent document, a positive electrode tab is arranged at one end of the electrode body, and a negative electrode tab is arranged at the other end thereof. Then, this patent document proposes that the positive electrode tab and the negative electrode tab are bent, and are connected with the collector. As a result, it is possible to implement the combination of a larger capacity and a higher output of the secondary battery.

SUMMARY

With the secondary battery in which the electrode body is provided with an electrode tab group, the junction between the electrode tab group and the collector may sustain damage (such as foil cutting or peeling of the junction). Specifically, the secondary battery may be applied with an external vibration or impact in use or during manufacturing. When the external force such as a vibration moves the electrode body in the inside of the battery case, and shifts the electrode body from the prescribed arrangement position, a large stress acts on the junction between the electrode tab group and the collector. Herein, an electrode tab forming the electrode tab group includes a part of collecting foil, or the like, and is very soft and has a low strength. For this reason, when the stress due to the movement of the electrode body repeatedly acts thereon, damage thereon may be caused with ease.

The present invention was completed in view of the foregoing circumstances. It is an object of the present invention to provide a technology of suppressing the movement of the electrode body in the inside of the battery case, and preventing the damage at the junction between the electrode tab group and the collector.

A secondary battery herein disclosed includes: an exterior body having a bottom wall, a pair of first sidewalls extending from the bottom wall, and facing each other, a pair of second sidewalls extending from the bottom wall, and facing each other, and an opening facing the bottom wall; a sealing plate for sealing the opening; an electrode body accommodated in an inside of the exterior body, and including a first electrode sheet, and a second electrode sheet having a different polarity from that of the first electrode sheet; a first electrode tab group provided at a first end face on one side of the electrode body facing one of the pair of first sidewalls, and electrically connected with the first electrode sheet; a second electrode tab group provided on a second end face of the electrode body facing the other of the pair of first sidewalls, and electrically connected with the second electrode sheet; a terminal fixed at the sealing plate; and a collector electrically connected with the terminal and the electrode body. The collector has a first collector to be connected with the first electrode tab group, and a second collector to be connected with the second electrode tab group. At least any one of the first collector and the second collector has: a first region part to be joined with the first electrode tab group or the second electrode tab group, a second region part to be connected with the terminal, and a third region part closer to the electrode body than the first region part.

The collector of the secondary battery with the foregoing configuration has a third region part closer to the electrode body than the first region part. Such a third region part restricts the movement of the electrode body. As a result, even when the secondary battery is applied with an external force such as a vibration, it is possible to prevent a large stress from acting on the junction between the electrode tab group and the collector. As a result of this, it is possible to prevent the damage on the junction between the electrode tab group and the collector.

In accordance with one preferable aspect of the secondary battery herein disclosed, the third region part is arranged closer to the bottom wall of the exterior body than the first region part, and a step is provided between the first region part and the third region part. With such a configuration, the effects of the technology herein disclosed can be properly exhibited.

In accordance with another preferable aspect, the second region part is arranged closer to the sealing plate than the first region part, a step is provided between the second region part and the first region part, and the first region part is closer to the first sidewall of the exterior body than the second region part. With such a configuration, the effects of the technology herein disclosed can be properly exhibited.

In accordance with a still other preferable aspect, the third region part is in contact with the first end face or the second end face. With such a configuration, the movement of the electrode body can be more properly suppressed.

In accordance with a furthermore preferable aspect, the third region part is closer to the electrode body than the second region part. With such a configuration, the movement of the electrode body can be more properly suppressed.

In accordance with a still other preferable aspect, the collector includes an insulation layer on a surface on the electrode body side of the third region part. With such a configuration, in addition to the prevention of breakage at the junction, the short circuit preventing effect can be exhibited.

DETAILED DESCRIPTION OF THE PREFERRED EMBODIMENTS

Below, referring to the accompanying drawings, some preferable embodiments of the technology herein disclosed will be described. Incidentally, matters necessary for executing the present invention, except for matters specifically referred to in the present specification (e.g., a general configuration and manufacturing process of a secondary battery not characterizing the technology herein disclosed) can be grasped as design matters of those skilled in the art based on the related art in the present field. The technology herein disclosed can be executed based on the contents disclosed in the present specification, and the technical common sense in the present field.

In the present specification, the term "secondary battery" denotes an electric storage device capable of repeatedly charging and discharging in general, and is a concept including a so-called storage battery (chemical battery) such as a lithium ion secondary battery or a nickel hydrogen battery, and a capacitor (physical battery) such as an electric double layer capacitor.

1. First Embodiment

Secondary Battery 100

Figure 1:
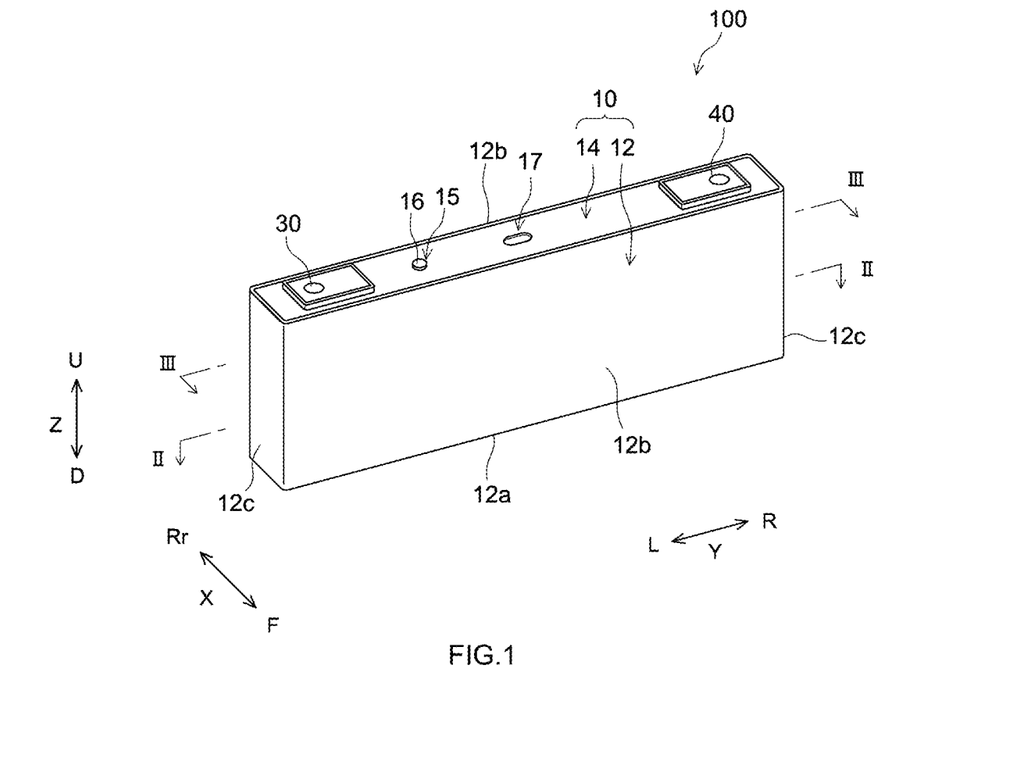
FIG. 1 is a perspective view schematically showing a secondary battery in accordance with one embodiment.
Figure 2:
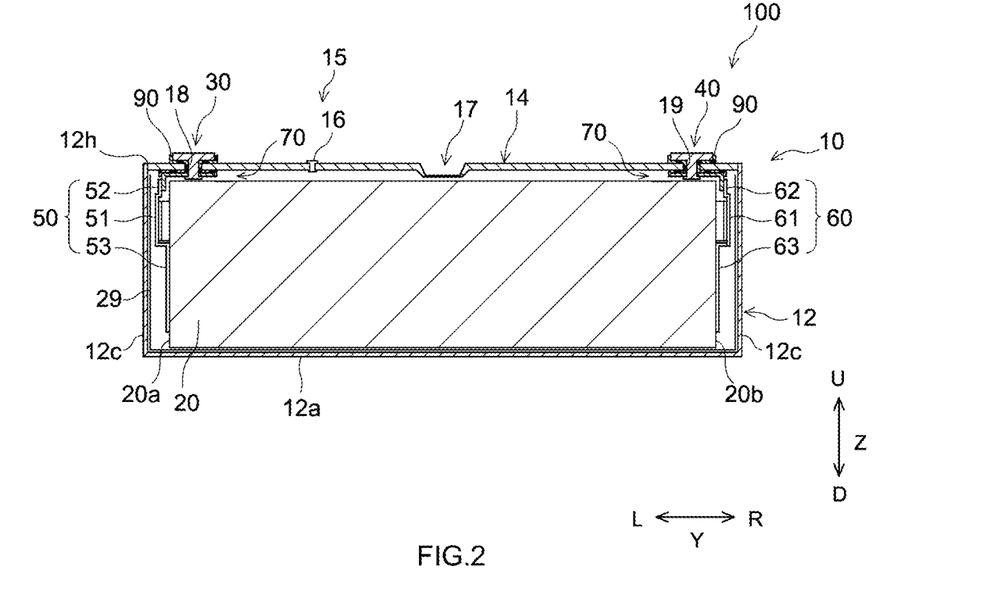
FIG. 2 is a schematic cross sectional view along line II-II of FIG. 1.
Figure 3:
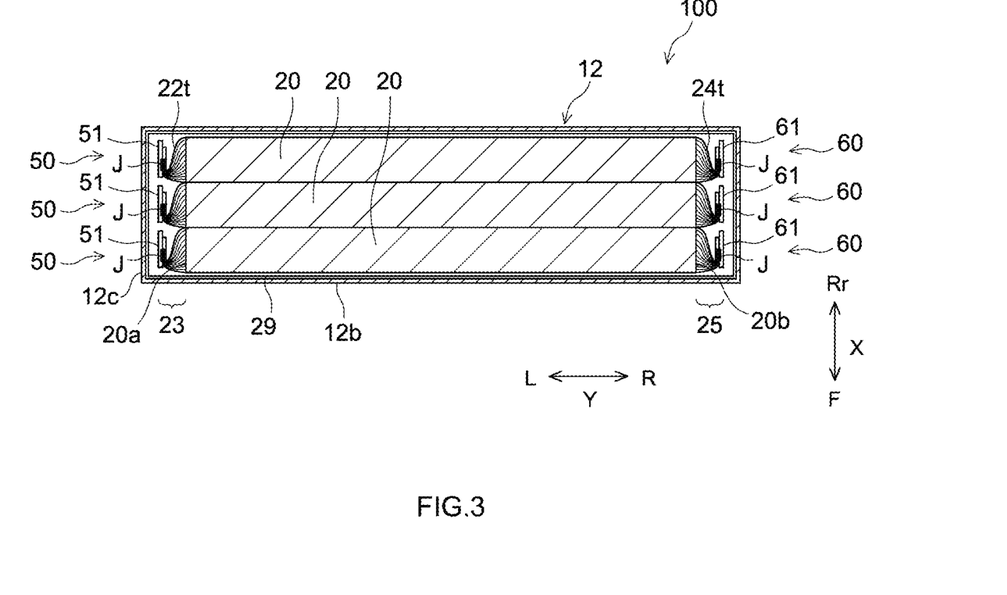
FIG. 3 is a schematic cross sectional view along line of FIG. 1.

FIG. 1 is a perspective view schematically showing a secondary battery in accordance with one embodiment. FIG. 2 is a schematic cross sectional view along line II-II of FIG. 1. FIG. 3 is a schematic cross sectional view along line III-III of FIG. 1. Further, a reference sign X in each figure referred to in the present specification represents "the depth direction", a reference sign Y represents "the width direction" and a reference sign Z represents "the height direction". Further, F in the depth direction X represents the "front", and Rr represents "the rear". L in the width direction Y represents the "left", and R represents the "right". Then, U in the height direction Z represents the "up", and D represents the "down". However, these are merely the directions for convenience of description, and do not restrict the arrangement form of a secondary battery 100 at all.

As shown in FIG. 2, the secondary battery 100 includes a battery case 10, an electrode body 20, a positive electrode terminal 30, a negative electrode terminal 40, a positive electrode collector 50, a negative electrode collector 60, and an insulator 70. Although not shown, the secondary battery 100 herein further includes an electrolyte. The secondary battery 100 is herein a lithium ion secondary battery. The positive electrode collector 50 and the negative electrode collector 60 are examples of the first collector and second collector of the secondary battery herein disclosed, respectively.

The battery case 10 is a housing for accommodating the electrode body 20 therein. The battery case 10 herein has an outward shape in a flat and bottomed rectangular parallelepiped shape (square shape). The material for the battery case 10 may be the same as the material conventionally used, and has no particular restriction. The battery case 10 is preferably made of a metal, and more preferably includes, for example, aluminum, an aluminum alloy, iron, or an iron alloy. Incidentally, other than the electrode body 20, an electrolyte (not shown) is also accommodated in the inside of the battery case 10. For such an electrolyte, the one usable in this kind of secondary battery can be used without particular restriction, and the electrolyte does not characterize the technology herein disclosed, and hence a detailed description thereon is omitted.

As shown in FIG. 2, the battery case 10 includes an exterior body 12 having an opening 12h, and a sealing plate (sealing sheet, lid body) 14 for closing the opening 12h. The exterior body 12 includes, as shown in FIG. 1, a bottom wall 12a in a rectangular shape in a plan view, a pair of long sidewalls 12b extending in the height direction Z from respective long sides of the bottom wall 12a, and opposed to each other, and a pair of short sidewalls 12c extending from the short sides of the bottom wall 12a in the height direction, and opposed to each other. The short sidewall 12c is one example of a first sidewall of the secondary battery herein disclosed. The long sidewall 12b is one example of a second sidewall in the secondary battery herein disclosed. The bottom wall 12a is opposed to the opening 12h. The area of the short sidewall 12c is smaller than the area of the long sidewall 12b. The sealing plate 14 is mounted on the exterior body 12 so as to close the opening 12h of the exterior body 12. The sealing plate 14 is opposed to the bottom wall 12a of the exterior body 12. The sealing plate 14 is in a generally rectangular shape in a plan view. The battery case 10 is integrated by joining the sealing plate 14 with the peripheral edge of the opening 12h of the exterior body 12. The battery case 10 is hermetically sealed (closed).

As shown in FIG. 2, the sealing plate 14 is provided with a solution introduction port 15, a gas discharge valve 17, and two terminal lead-out holes 18 and 19. The solution introduction port 15 is for introducing an electrolyte after mounting the sealing plate 14 on the exterior body 12. The solution introduction port 15 is sealed by a sealing member 16. The gas discharge valve 17 is a thin wall part configured so as to rupture when the pressure in the battery case 10 becomes a prescribed value or higher, and to discharge the gas in the battery case 10. The terminal lead-out holes 18 and 19 are formed at opposite ends in the width direction Y of the sealing plate 14, respectively. The terminal lead-out holes 18 and 19 penetrate through the sealing plate 14 in the height direction Z. The terminal lead-out holes 18 and 19 each have an inner diameter of a size allowing the positive electrode terminal 30 and the negative electrode terminal 40 respectively before being mounted on the sealing plate 14 (before caulking) to be inserted therethrough.

The secondary battery herein disclosed includes a terminal fixed at the sealing plate. Herein, the positive electrode terminal 30 and the negative electrode terminal 40 are fixed at the sealing plate 14, respectively. The positive electrode terminal 30 is arranged on one side in the width direction Y of the sealing plate 14 (on the left side of FIG. 1 and FIG. 2). The negative electrode terminal 40 is arranged on the other side in the width direction Y of the sealing plate 14 (on the right side of FIG. 1 and FIG. 2). For the positive electrode terminal 30, for example, aluminum is used.

Figure 7:
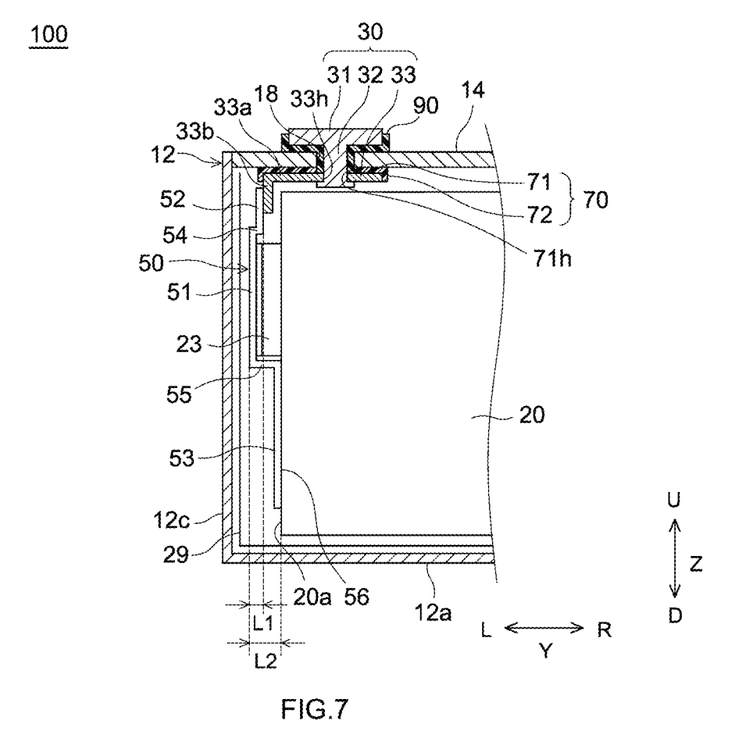
FIG. 7 is a partially enlarged cross sectional view schematically showing the vicinity of a positive electrode terminal and a positive electrode collector in one embodiment.

The positive electrode terminal 30 has a flat-sheet-shaped base 31 arranged on the outer surface of the sealing plate 14, a shaft part 32 extending downward (toward the bottom wall 12a side) in the height direction Z from the base 31, and a collector connection part 33 connected to the positive electrode collector 50 and the shaft part 32 (see FIG. 7). As shown in FIG. 7, the base 31 of the positive electrode terminal 30 is exposed to the outer surface of the sealing plate 14. As shown in FIG. 7, the shaft part 32 of the positive electrode terminal 30 is inserted through the terminal lead-out hole 18, and extends from the outside to the inside of the sealing plate 14. The positive electrode terminal 30 is herein fixed at the peripheral edge portion surrounding the terminal lead-out hole 18 of the sealing plate 14 by caulking. Further, the collector connection part 33 is the portion to be connected with a positive electrode collector 50 described later. The collector connection part 33 is formed in a L-shaped cross section, and has an upper part 33a arranged along the inner surface of the sealing plate 14, and a lower part 33b extending from one end in the width direction Y of the upper part 33a (each left end of FIG. 2 and FIG. 7) downward (toward the bottom wall 12a side). At the upper part 33a of the collector connection part 33, a through hole 33h penetrating in the height direction Z is formed. Such a through hole 33h is arranged at the position corresponding to the terminal lead-out hole 18 of the sealing plate 14, and the shaft part 32 is inserted therethrough. As a result, the positive electrode terminal 30 is constructed. Incidentally, the collector connection part 33 may be configured by bending one sheet-shaped member by, for example, press working, or may be configured by integrating a plurality of members by weld joining, or the like. Further, for the positive electrode terminal 30 in the present embodiment, the base 31 and the shaft part 32 are integrated with each other, and the collector connection part 33 is a different body (see FIG. 7). However, the detailed structure of the positive electrode terminal 30 has no particular restriction, and may be formed so that the base 31, the shaft part 32, and the collector connection part 33 are integrated to one another. Further, although not described in details, for the secondary battery 100 in accordance with the present embodiment, the negative electrode terminal 40 also has generally the same structure as that of the positive electrode terminal 30. Incidentally, for the material for the negative electrode terminal 40, copper or the like is used.

As shown in FIG. 2, the positive electrode terminal 30 is electrically connected with the positive electrode sheet 22 of the electrode body 20 (see FIG. 6) via the positive electrode collector 50 in the inside of the exterior body 12. The negative electrode terminal 40 is electrically connected with the negative electrode sheet 24 of the electrode body 20 (see FIG. 6) via the negative electrode collector 60 in the inside of the exterior body 12. Incidentally, both of the positive electrode terminal 30 and the negative electrode terminal 40 are insulated from the sealing plate 14 by an insulator 70 and a gasket 90.

The insulator 70 is arranged between the positive electrode terminal 30 (typically, a collector connection part 33) and the inner surface of the sealing plate 14. The insulator 70 has a flat part 71 arranged along the inner surface of the sealing plate 14, and a wall part 72 formed so as to descend from the peripheral edge of the flat part 71 toward the electrode body 20 (see FIG. 7). The positive electrode terminal 30 is arranged in the concave part surrounded by the wall part 72. Further, a through hole 71h is formed in the flat part 71. The gasket 90 is arranged between the positive electrode terminal 30 (typically, the base 31) and the outer surface of the sealing plate 14. Further, the gasket 90 has a tubular projection to be inserted into the terminal lead-out hole 18 of the sealing plate 14. The projection of such a gasket 90 is arranged so as to be along the inner circumference of the through hole 71h of the insulator 70. Provision of the insulator 70 and the gasket 90 with the foregoing configuration can prevent the contact between the positive electrode terminal 30 and the sealing plate 14. Incidentally, for the insulation structure using the insulator and the gasket, although the same structure is provided on the negative electrode terminal 40 side, a detailed description thereon will be omitted. Incidentally, the constituent materials for the insulator 70 and the gasket 90 have no particular restriction, and can be resin materials including polyolefin resins (e.g., polypropylene (PP) and polyethylene (PE)), fluorine resins (e.g., perfluoroalkoxy alkane (PFA) and polytetrafluoroethylene (PTFE)), and the like.

Figure 4:
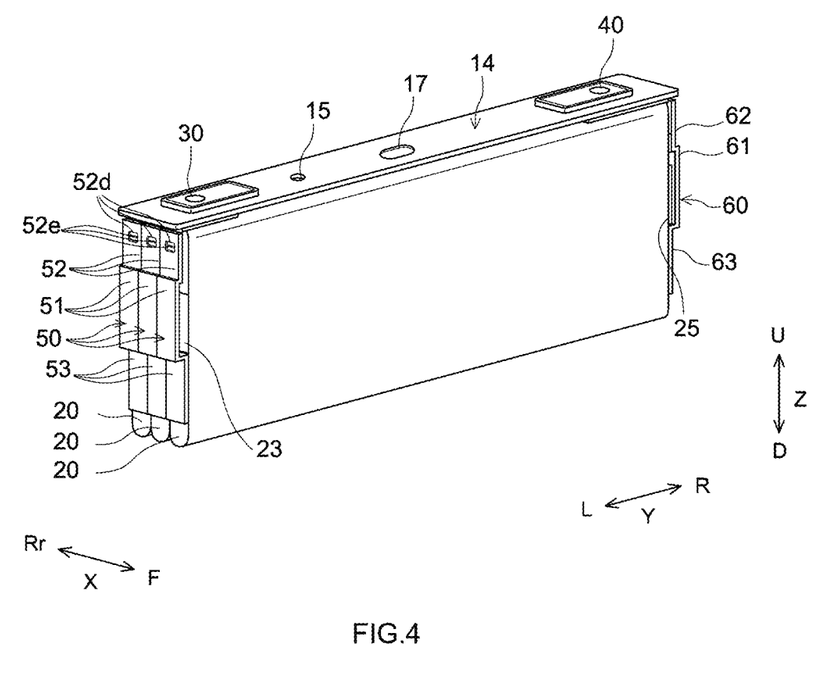
FIG. 4 is a perspective view schematically showing an electrode body mounted on a sealing plate.
Figure 5:
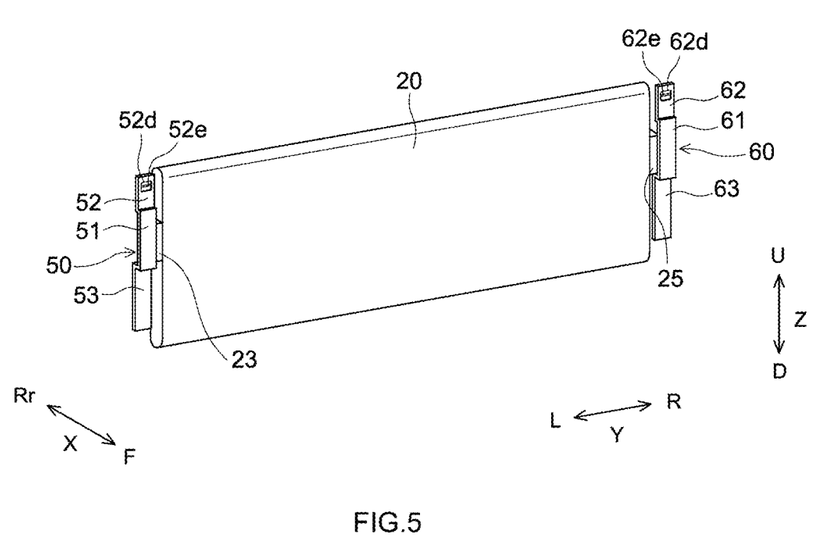
FIG. 5 is a perspective view schematically showing an electrode body with a positive electrode collector and a negative electrode collector mounted thereon.

FIG. 4 is a perspective view schematically showing the electrode body mounted at the sealing plate. Further, FIG. 5 is a perspective view schematically showing the electrode body including the positive electrode collector and the negative electrode collector mounted thereon. As shown in FIG. 3 and FIG. 4, the secondary battery 100 in accordance with the present embodiment includes three electrode bodies 20. However, the number of the electrode bodies to be arranged in the inside of one exterior body 12 has no particular restriction, and may be two or more (plural), or may be 1. Further, as shown in FIG. 4 and FIG. 5, a positive electrode collector 50 and a negative electrode collector 60 described later are mounted on each electrode body 20. Then, the electrode body 20 is herein arranged in the inside of the exterior body 12 while being covered with an electrode body holder 29 (see FIG. 2) including a sheet made of a resin.

Figure 6:
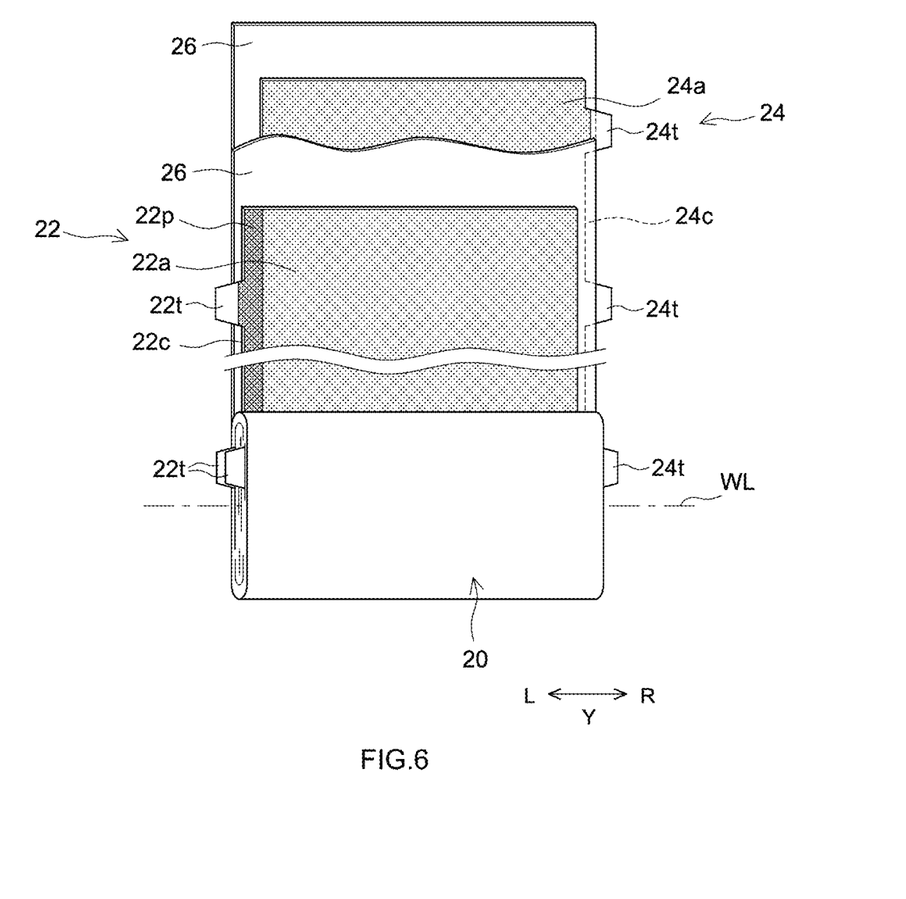
FIG. 6 is a schematic view showing a configuration of an electrode body in one embodiment.

FIG. 6 is a schematic view showing the configuration of the electrode body. As shown in FIG. 6, the electrode body 20 has a positive electrode sheet 22 and a negative electrode sheet 24. The electrode body 20 is herein a flat-shaped wound electrode body configured such that a band-shaped positive electrode sheet 22 and a band-shaped negative electrode sheet 24 are stacked via a band-shaped separator 26, and are wound with a winding axis WL as the center. The positive electrode sheet 22 is one example of a first electrode sheet in the secondary battery herein disclosed. Then, the negative electrode sheet 24 is one example of a second electrode sheet in the secondary battery herein disclosed. Incidentally, in the following description, the electrode body 20 is appropriately referred to as a "wound electrode body 20". However, such a description is not intended to restrict the structure of the electrode body in the technology herein disclosed to the wound electrode body.

As shown in FIG. 2, the wound electrode body 20 is arranged in the inside of the exterior body 12 with the winding axis WL oriented in parallel with the width direction Y. In other words, the wound electrode body 20 is arranged in the inside of the exterior body 12 with the winding axis WL oriented in parallel with the bottom wall 12a, and orthogonal to the short sidewall 12c. Then, the opposite end faces of the wound electrode body 20 in the direction along the winding axis WL (i.e., the width direction Y in FIG. 6) are opposed to the short sidewalls 12c of the exterior body 12. In the present specification, for convenience of description, the end face of the wound electrode body 20 opposed to the short sidewall 12c on the side close to the positive electrode terminal 30 (on the left side in the width direction Y in FIG. 2) is referred to as a "first end face 20a". Then, the end face of the wound electrode body 20 opposed to the short sidewall 12c on the side close to the negative electrode terminal 40 (on the right side in the width direction Y in FIG. 2) is referred to as a "second end face 20b".

The positive electrode sheet 22 is a long band-shaped member as shown in FIG. 6. Such a positive electrode sheet 22 has a positive electrode collecting foil 22c, and a positive electrode active material layer 22a fixed on at least one surface of the positive electrode collecting foil 22c. Although not particularly restricted, one side edge in the width direction Y of the positive electrode sheet 22 may be provided with a positive electrode protective layer 22p, if required. Incidentally, for the materials forming the positive electrode active material layer 22a and the positive electrode protective layer 22p, those for used in this kind of secondary battery can be used without particular restriction. The materials do not characterize the technology herein disclosed, and hence will not be described in details.

One end in the width direction Y of the band-shaped positive electrode collecting foil 22c (the left end of FIG. 6) is provided with a plurality of positive electrode tabs 22t. The plurality of positive electrode tabs 22t respectively protrude toward one side in the width direction Y (the left side of FIG. 6). The plurality of positive electrode tabs 22t protrude more outwardly in the width direction Y than the separator 26. The plurality of positive electrode tabs 22t are provided at intervals (intermittently) along the longitudinal direction of the positive electrode sheet 22. The plurality of positive electrode tabs 22t are each in a trapezoidal shape. The positive electrode tab 22t is herein a part of the positive electrode collecting foil 22c, and includes metal foil (e.g., aluminum foil). The positive electrode tab 22t is a portion (collecting foil exposed part) of the positive electrode collecting foil 22c at which the positive electrode active material layer 22a and the positive electrode protective layer 22p are not formed. However, the positive electrode tab 22t may be a different member from the positive electrode collecting foil 22c. Further, the positive electrode tab 22t may be provided at the other end in the width direction Y (the right end of FIG. 6), or may be provided at each opposite end in the width direction Y.

As shown in FIGS. 2 and 3, the plurality of positive electrode tabs 22t are stacked at one end in the width direction Y (the left end of FIG. 3), and form a positive electrode tab group 23. In other words, the positive electrode tab group 23 is provided at the first end face 20a of the wound electrode body 20 opposed to the short sidewall 12c on one side (on the positive electrode terminal 30 side) of the exterior body 12. The plurality of positive electrode tabs 22t are bent and curved so that the ends on the outward side are aligned. The positive electrode tab group 23 is electrically connected with the positive electrode terminal 30 via the positive electrode collector 50. The plurality of positive electrode tabs 22t are preferably bent. The sizes (the length in the width direction Y and the length orthogonal to the width direction Y, see FIG. 6) of the plurality of positive electrode tabs 22t can be appropriately adjusted according to, for example, the formation position in consideration of how the positive electrode tabs 22t are connected with the positive electrode collector 50. Incidentally, the positive electrode tab group 23 is one example of the first electrode tab group in the secondary battery herein disclosed.

As with the positive electrode sheet 22, the negative electrode sheet 24 is also a long band-shaped member. The negative electrode sheet 24 has, as shown in FIG. 6, a negative electrode collecting foil 24c, and a negative electrode active material layer 24a fixed on at least one surface of the negative electrode collecting foil 24c. Incidentally, for the materials forming the negative electrode active material layer 24a, those for use in this kind of secondary battery can be used without particular restriction. The materials do not characterize the technology herein disclosed, and hence will not be described in details.

One end in the width direction Y of the band-shaped negative electrode collecting foil 24c (the right end of FIG. 6) is provided with a plurality of negative electrode tabs 24t. The plurality of negative electrode tabs 24t protrude toward one side in the width direction Y (the right side of FIG. 6). The plurality of negative electrode tabs 24t protrude more outwardly in the width direction Y than the separator 26. The plurality of negative electrode tabs 24t are provided at intervals (intermittently) along the longitudinal direction of the negative electrode sheet 24. The plurality of negative electrode tabs 24t are each in a trapezoidal shape. The negative electrode tab 24t is herein a part of the negative electrode collecting foil 24c, and includes metal foil (e.g., copper foil). The negative electrode tab 24t is herein a portion (collecting foil exposed part) of the negative electrode collecting foil 24c at which the negative electrode active material layer 24a is not formed. However, the negative electrode tab 24t may be a different member from the negative electrode collecting foil 24c. Further, the negative electrode tab 24t may be provided at the other end in the width direction Y (the left end of FIG. 6), or may be provided at each opposite end in the width direction Y.

As shown in FIGS. 2 and 3, the plurality of negative electrode tabs 24t are stacked at one end in the width direction Y (the right end of FIG. 6), and form a negative electrode tab group 25. In other words, the negative electrode tab group 25 is provided at the second end face 20b of the wound electrode body 20 opposed to the short sidewall 12c on the other side (on the negative electrode terminal 40 side) of the exterior body 12. The plurality of negative electrode tabs 24t are bent and curved so that the ends on the outward side are aligned. The negative electrode tab group 25 is electrically connected with the negative electrode terminal 40 via the negative electrode collector 60. The plurality of negative electrode tabs 24t are preferably bent.

The sizes (the length in the width direction Y and the length orthogonal to the width direction Y, see FIG. 6) of the plurality of negative electrode tabs 24*t* can be appropriately adjusted according to, for example, the formation position in consideration of how the negative electrode tabs 24*t* are connected with the negative electrode collector 60. Incidentally, the negative electrode tab group 25 is one example of the second electrode tab group in the secondary battery herein disclosed.

A separator 26 is an insulating member interposed between the positive electrode sheet 22 and the negative electrode sheet 24. As shown in FIG. 6, the wound electrode body 20 in the present embodiment includes two long band-shaped separators 26. Incidentally, the materials forming the separator 26 may be the same as those of the separator for use in this kind of secondary battery. The materials do not characterize the technology herein disclosed, and hence will not be described in details.

Figure 8:
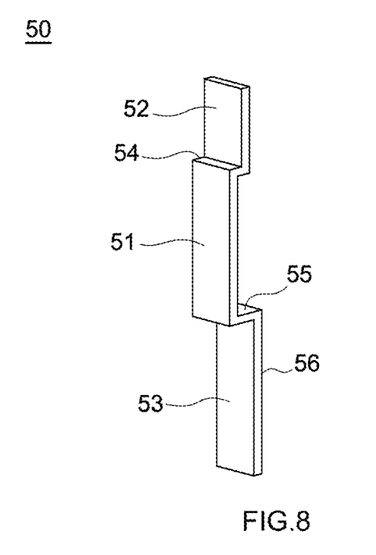
FIG. 8 is a perspective view schematically showing a positive electrode collector for use in a secondary battery in accordance with one embodiment.
Figure 9:
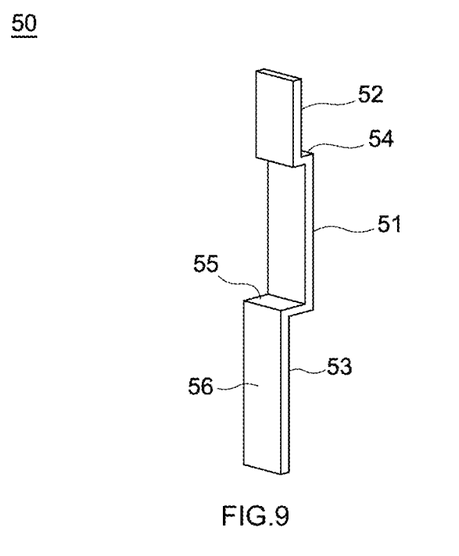
FIG. 9 is a perspective view of the positive electrode collector of FIG. 8 in a reversed form.

Herein, the secondary battery 100 in accordance with the present embodiment is characterized by using a collector of a structure capable of suppressing the movement of the wound electrode body 20 with the foregoing configuration. Below, the case using such a collector for the positive electrode collector 50 will be described by reference to FIG. 7 to FIG. 9. Incidentally, FIG. 7 is a partially enlarged cross sectional view schematically showing the vicinity of the positive electrode terminal and the positive electrode collector in one embodiment. Further, FIG. 8 is a perspective view schematically showing the positive electrode collector. FIG. 9 is a perspective view of the positive electrode collector of FIG. 8 in a reversed form.

The positive electrode collector 50 is one example of the first collector in the secondary battery herein disclosed. The positive electrode collector 50 constructs a conduction path for electrically connecting the positive electrode terminal 30 and the wound electrode body 20. Specifically, the collector connection part 33 of the positive electrode terminal 30 and the positive electrode collector 50 are connected, thereby constructing the conduction path of the positive electrode terminal 30 and the positive electrode collector 50. Further, the positive electrode tab group 23 of the wound electrode body 20 and the positive electrode collector 50 are connected with each other, thereby constructing the conduction path of the wound electrode body 20 and the positive electrode collector 50. Incidentally, the positive electrode collector 50 may include the same metal species as that of the positive electrode collecting foil 22*c*. Then, the positive electrode collector 50 in the present embodiment has, as shown in FIGS. 4, 5, and FIGS. 7 to 9, a first region part 51, a second region part 52, and a third region part 53.

The first region part 51 is the portion to be joined with the positive electrode tab group 23 (i.e., the plurality of positive electrode tabs 22*t*). The first region part 51 is a sheet-shaped portion arranged so as to be opposed to the short sidewall 12*c* of the exterior body 12. Further, the surface of the first region part 51 to be joined with the positive electrode tab group 23 is opposed to the first end face 20*a* of the wound electrode body 20. As shown in FIG. 3, at the first region part 51, a junction J with the positive electrode tab group 23 is formed. The junction J is, for example, a welded junction obtained by welding the plurality of positive electrode tabs 22*t* being stacked on one another on the surface of the first region part 51 using a conventionally known welding means. The junction J is arranged with the plurality of positive electrode tabs 22*t* set closer to one side in the depth direction X of the wound electrode body 20 (the front side in FIG. 3).

The second region part 52 is a portion to be connected with the positive electrode terminal 30. As shown in FIGS. 4, 5, and 7, the second region part 52 is a sheet-shaped portion arranged above the first region part 51 (on the sealing plate 14 side), and extending along the height direction Z. The upper end of the second region part 52 is connected with the collector connection part 33 of the positive electrode terminal 30, thereby constructing the conduction path of the positive electrode terminal 30 and the positive electrode collector 50. Specifically, the second region part 52 is provided with a concave part 52*d* with a smaller thickness than that of the periphery thereof. The concave part 52*d* is provided with a through hole 52*e* penetrating in the depth direction X. Then, the collector connection part 33 of the positive electrode terminal 30 is inserted through the through hole 52*e* of the second region part 52, thereby forming the junction. As a result of this, the positive electrode collector 50 and the positive electrode terminal 30 are fixed. The junction at this step may be the welded junction formed using, for example, a conventionally known welding means. Further, the second region part 52 may be provided with a fuse. The fuse is a portion with a smaller thickness than those of other portions of the second region part 52, and is configured so as to be ruptured by being applied with a heat at the time of short circuit or at the time of overcharging of the secondary battery 100.

Further, a first step part 54 is provided between the first region part 51 and the second region part 52. The first step part 54 connects the upper end of the first region part 51 and the lower end of the second region part 52. The first step part 54 is arranged so as to be along the sealing plate 14 of the exterior body 12. The first step part 54 is formed so that the second region part 52 is arranged on the side of the center in the width direction Y (closer to the wound electrode body 20) than the first region part 51. In other words, the second region part 52 of the positive electrode collector 50 in the present embodiment is closer to the wound electrode body 20 than the first region part 51, and the first region part 51 is closer to the short sidewall 12*c* of the exterior body 12 than the second region part 52. In this manner, the first region part 51 is arranged on the short sidewall 12*c* side. This can contribute to the increase in dimensions in the width direction Y of the wound electrode body 20, and the increase in volume ratio of the wound electrode body 20 with respect to the internal amount of the exterior body 12. Further, the first region part 51 below the second region part 52 is set at the junction position with the positive electrode tab group 23. This can ensure the distance between the lower part 33*b* of the collector connection part 33 and the wound electrode body 20, and can prevent the contact therebetween. Incidentally, the first step part 54 shown in FIG. 7 is formed generally perpendicular to each of the first region part 51 and the second region part 52. However, the angle of the first step part 54 with respect to the first region part 51 has no particular restriction. Incidentally, in the present specification, the wording "A and B being generally perpendicular to each other" includes, other than "the angle formed by A and B being 90 degrees", the case where the angle can be substantially regarded as perpendicular" so long as the effects of the technology herein disclosed can be implemented. For example, the case where the angle formed by A and B is 85 degrees or more and 95 degrees or less can be included.

The third region part 53 is a portion closer to the wound electrode body 20 than the first region part 51. The third region part 53 in the present embodiment is a sheet-shaped portion connected with the first region part 51 as shown in FIG. 7. The third region part 53 is arranged on the lower side of the first region part 51 (on the bottom wall 12a side), and extends along the height direction Z. Then, the third region part 53 of the positive electrode collector 50 in the present embodiment is in contact with the first end face 20a of the wound electrode body 20. Further, as described above, the positive electrode collector 50 is fixed with the positive electrode terminal 30 at the second region part 52. Namely, with the secondary battery 100 in accordance with the present embodiment, the third region part 53 of the positive electrode collector 50 fixed at the positive electrode terminal 30 can restrict the movement of the wound electrode body 20. As a result, even when the secondary battery 100 is applied with an external force such as a vibration, it is possible to prevent a large stress from acting on the junction J between the positive electrode tab group 23 and the positive electrode collector 50 (first region part 51). This can prevent the occurrence of damages in the vicinity of the junction J. Further, when the positive electrode collector 50 is imparted with a function of restricting the movement of the wound electrode body 20 as with the foregoing configuration, the positive electrode collector 50 becomes an integral component for implementing both the connection with the positive electrode terminal 30, and the restriction on the movement of the wound electrode body 20. This eliminates the necessity of another component for restricting the movement of the wound electrode body 20, which can simplify the assembly operation. For example, when the secondary battery 100 is mass-produced using equipment, the equipment functions can be reduced. In other words, by using the positive electrode collector 50 with the foregoing configuration, it is possible to reduce the number of components when the secondary battery 100 is assembled. For this reason, it is possible to provide the secondary battery 100 with high assemblability.

Further, in the positive electrode collector 50 in the present embodiment, a second step part 55 is provided between the first region part 51 and the third region part 53. The second step part 55 connects the lower end of the first region part 51 and the upper end of the third region part 53. The second step part 55 is arranged so as to be along the sealing plate 14. Provision of such a second step part 55 can readily construct the positive electrode collector 50 in which the third region part 53 is closer to the wound electrode body 20 than the first region part 51. Further, such a second step part 55 can be formed only by bending the sheet-shaped positive electrode collector 50, which can also contribute to the improvement of the manufacturing efficiency.

Further, the positive electrode collector 50 in the present embodiment is formed such that the third region part 53 is closer to the wound electrode body 20 than the second region part 52. In other words, in the positive electrode collector 50, the length L1 in the width direction Y of the first step part 54 is shorter than the length L2 of the second step part 55 in the same direction, so that the third region part 53 is arranged closer to the center than the second region part 52. This facilitates the contact of the third region part 53 with the first end face 20a of the wound electrode body 20. For this reason, the movement of the wound electrode body 20 in the inside of the battery case 10 can be more properly restricted.

Further, as shown in FIGS. 7 to 9, an insulation layer 56 is provided on the surface on the wound electrode body 20 side of the third region part 53. As a result of this, the short circuit preventing effect can be exhibited. Although not particularly restricted, during vibration of the secondary battery, when the end face of the electrode body is in contact with the third region part, such a contact part undergoes deformation. Thus, with the collector as the conduction path, a short circuit may be caused between the first electrode sheet (positive electrode sheet) and the second electrode sheet (negative electrode sheet). Provision of the insulation layer as described above can prevent the short circuit even when excessive deformation is caused, the short circuit can be prevented. Incidentally, the insulation layer 56 may be formed by bonding a film made of a resin to the third region part 53 by an adhesive, or the like. Alternatively, the insulation layer 56 may also be formed by applying a resin material on the surface for solidification. The materials forming the insulation layer 56 has no particular restriction so long as the materials can insulate the positive electrode collector 50 and the wound electrode body 20, and resin materials such as polyethylene (PE) and polypropylene (PP) can be used. Incidentally, in the embodiment shown, the insulation layer 56 is formed entirely on the surface, and is not limited thereto, and may be formed at least a part of the surface. Still alternatively, the formation of the insulation layer 56 may be omitted.

Incidentally, the negative electrode collector 60 in the present embodiment is one example of the second collector in the secondary battery herein disclosed. As shown in FIG. 2, the negative electrode collector 60 includes a first region part 61, a second region part 62, and a third region part 63 as with the positive electrode collector 50. As a result of this, the movement of the wound electrode body 20 in the inside of the battery case 10 can be more properly restricted. Incidentally, as described above, the negative electrode collector 60 has substantially the same configuration as that of the positive electrode collector 50. The detailed description thereon becomes an overlapping description, and hence will be herein omitted. Further, the collector including the first region part, the second region part, and the third region part may be used for either one of the positive electrode collector and the negative electrode collector.

Further, the structure of the electrode body 20 in the secondary battery 100 in accordance with the present embodiment is not limited to the foregoing wound electrode body. For example, the electrode body 20 may be a lamination electrode body including a plurality of square-shaped (typically, a rectangular-shaped) positive electrode sheets, and a plurality of square-shaped (typically, rectangular-shaped) negative electrode sheets stacked one on another while being insulated from one another.

Up to this point, the secondary battery 100 in accordance with one embodiment of the technology herein disclosed has been described. The secondary battery 100 with the foregoing configuration is usable for various uses, and can be preferably used for uses in which an external force such as a vibration or an impact tends to be applied in use, for example, a power source (a driving power supply) for a motor to be mounted on a mobile unit (typically, a car such as an automobile or a truck). The kind of the automobile has no particular restriction. Examples thereof may include a Plug-in Hybrid Electric Vehicle (PHEV), a Hybrid Electric Vehicle (HEV), and a Battery Electric Vehicle (BEV). The secondary battery 100 can also be preferably used as an assembled battery obtained by arraying a plurality of secondary batteries 100 in a prescribed array direction, and applying a load thereon from the array direction by a binding mechanism.

2. Other Embodiments

The first embodiment is merely one example of the secondary battery herein disclosed. The technology herein disclosed can be additionally carried out in various forms. Below, other embodiments of the technology herein disclosed will be described.

Second Embodiment

Figure 10:
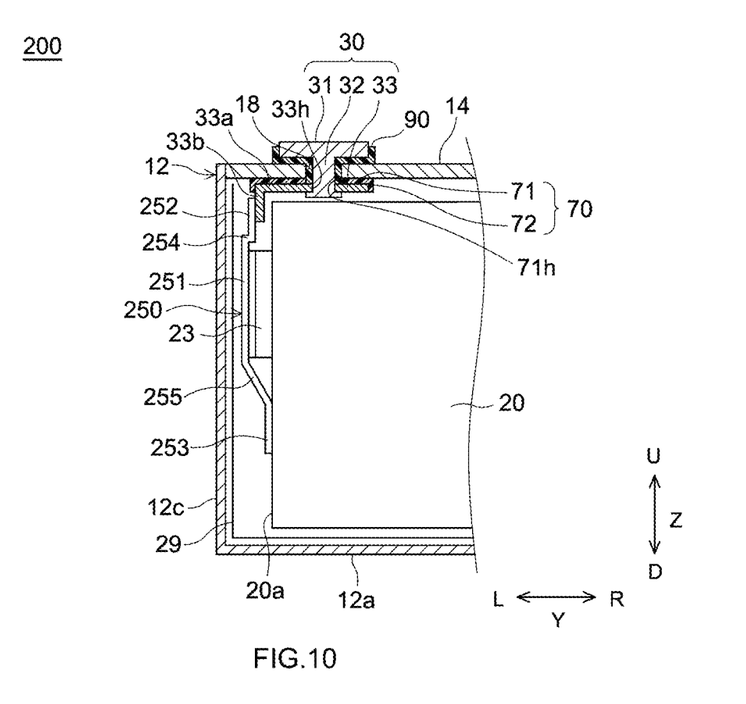
FIG. 10 is a partially enlarged cross sectional view schematically showing the vicinity of a positive electrode terminal and a positive electrode collector in second embodiment.

For example, in the first embodiment, the second step part 55 was provided between the first region part 51 and the third region part 53 of the positive electrode collector 50. However, the shape of the positive electrode collector 50 is not limited thereto. FIG. 10 is a partially enlarged cross sectional view schematically showing the vicinity of the positive electrode terminal and the positive electrode collector in the second embodiment. The secondary battery 200 in accordance with the second embodiment includes a positive electrode collector 250 having an inclined part 255 between a first region part 251 and a third region part 253. Specifically, as shown in FIG. 10, the inclined part 255 of the positive electrode collector 250 is preferably configured so as to get closer to the end face 20a of the wound electrode body 20 with approach toward the lower side in the height direction Z (the bottom wall 12a side) (i.e., to get closer to the center in the width direction Y). Even when the positive electrode collector 250 with such a configuration is used, the movement of the wound electrode body 20 can be properly restricted, and the breakage of the positive electrode tab group 23 by an external force such as a vibration can be prevented. Incidentally, the secondary battery 200 in accordance with the second embodiment may be the same as the secondary battery 100 in accordance with the first embodiment except for the foregoing point. Further, in the second embodiment, a first step part 254 is provided between a first region part 251 and a second region part 252. However, such a first step part 254 is not an essential structure, and can be changed to an inclined part, or the like.

Third Embodiment

Figure 11:
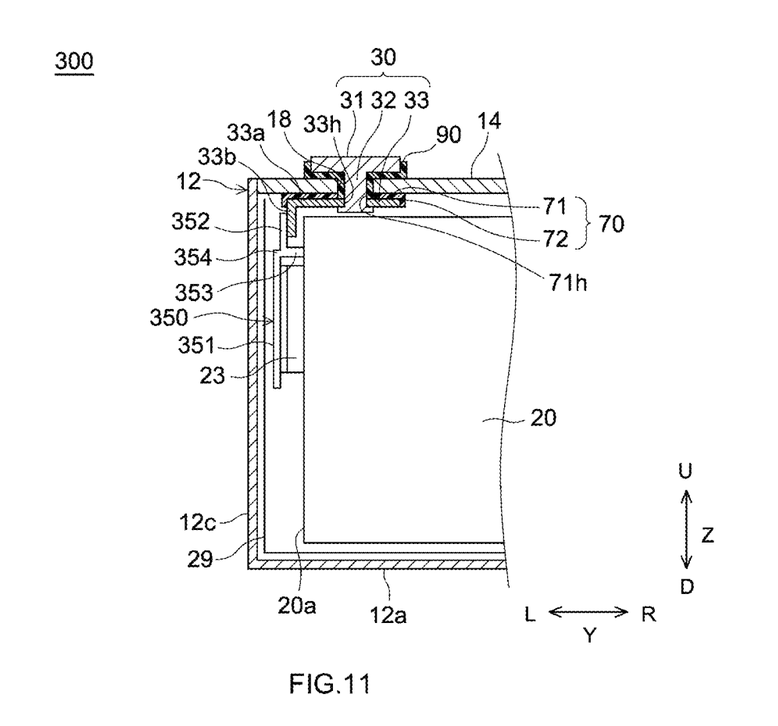
FIG. 11 is a partially enlarged cross sectional view schematically showing the vicinity of a positive electrode terminal and a positive electrode collector in third embodiment.

Further, in the first embodiment, the third region part 53 of the positive electrode collector 50 was formed closer to the bottom wall 12a (the lower side in the height direction Z) than the first region part 51. However, the third region part may only be closer to the wound electrode body than the first region part, and the formation position in the height direction Z has no restriction. FIG. 11 is a partially enlarged cross sectional view schematically showing the vicinity of the positive electrode terminal and the positive electrode collector in the third embodiment. A secondary battery 300 in accordance with the third embodiment includes a positive electrode collector 350 having a projection-shaped third region part 353 projecting from the second region part 352 (typically, the vicinity of a first step part 354) toward the wound electrode body 20 as shown in FIG. 11. Then, the projection-shaped third region part 353 is closer to the wound electrode body 20 than the first region part 351. Even when the positive electrode collector 350 with such a configuration is used, the movement of the wound electrode body 20 can be properly restricted, and the breakage of the positive electrode tab group 23 by an external force such as a vibration can be prevented. Incidentally, although not particularly restricted, the third region part 353 may only be in contact with the side surface of the wound electrode body 20. Further, the third region part 353 may only have an insulation layer (not shown) on the surface on the wound electrode body 20 side. Incidentally, the secondary battery 300 in accordance with the third embodiment may be the same as the secondary battery 100 in accordance with the first embodiment except for the foregoing point.

Fourth Embodiment

Figure 12:
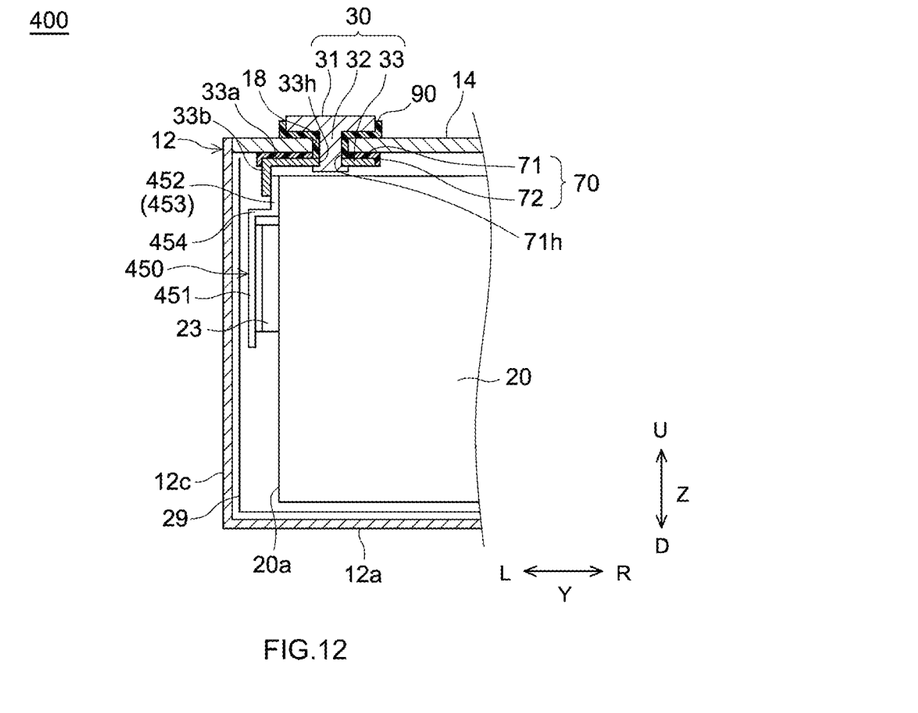
FIG. 12 is a partially enlarged cross sectional view schematically showing the vicinity of a positive electrode terminal and a positive electrode collector in fourth embodiment.

Further, in the positive electrode collector 50 in the first embodiment, the second region part 52 and the third region part 53 were formed of different members. However, there can be adopted such a configuration that the second region part is set closer to the wound electrode body than the first region part, and also serves as a third region part. FIG. 12 is a partially enlarged cross sectional view schematically showing the vicinity of the positive electrode terminal and the positive electrode collector in a fourth embodiment. A second region part 452 in a positive electrode collector 450 in a secondary battery 400 in accordance with the fourth embodiment is arranged between the lower part 33b of the collector connection part 33 of the positive electrode terminal 30 and the first end face 20a of the wound electrode body 20 in the width direction Y. Specifically, in this embodiment, the second region part 452 of the positive electrode collector 450 is inserted between the lower part 33b of the collector connection part 33 and the first end face 20a of the wound electrode body 20. When such a configuration is adopted, the second region part 452 is closer to the electrode body 20 than the first region part 451, and also functions as a third region part 453. For this reason, the movement of the wound electrode body 20 can be restricted. Incidentally, a first step part 454 is provided between the second region part 452 (the third region part 453) and the first region part 451. Further, although not particularly restricted, an insulation layer (not shown) is preferably provided on the surface on the wound electrode body 20 side of the second region part 452 (the third region part 453). Incidentally, the secondary battery 400 in accordance with the fourth embodiment may be the same as the secondary battery 100 in accordance with the first embodiment except for the foregoing point.

Up to this point, some embodiments of the technology herein disclosed were described. However, the technology can be executed additionally in various aspects. The technology herein disclosed can be executed based on the contents disclosed in the present specification, and the technical common sense in the present field. For example, a part of the embodiments can be replaced with other modified aspects, and other modified aspects can be added to the embodiments. Further, the technical features can be appropriately deleted unless the technical features are described as essential ones.

What is claimed is:

1. A secondary battery, comprising:
an exterior body having a bottom wall, a pair of first sidewalls extending from the bottom wall and facing each other, a pair of second sidewalls extending from the bottom wall and facing each other, and an opening facing the bottom wall;
a sealing plate sealing the opening;
an electrode body accommodated in an inside of the exterior body, and including a long band-shaped first electrode sheet, and a long band-shaped second electrode sheet having a different polarity from that of the first electrode sheet;
a first electrode tab group provided at a first end face of the electrode body facing one of the pair of first sidewalls, and electrically connected with the first electrode sheet;

a second electrode tab group provided on a second end face of the electrode body facing the other of the pair of first sidewalls, and electrically connected with the second electrode sheet;
a terminal fixed at the sealing plate; and
a collector electrically connected with the terminal and the electrode body,
wherein
the first electrode sheet comprises:
a first electrode collecting foil;
a first electrode active material layer fixed on at least one surface of the first electrode collecting foil; and,
first electrode tabs, respectively protruding toward one side in a width direction orthogonal to the longitudinal direction of the first electrode sheet, and provided at intervals along the longitudinal direction of the first electrode sheet,
the first electrode tab group comprises the first electrode tabs stacked at the first end face,
the second electrode sheet comprises:
a second electrode collecting foil;
a second electrode active material layer fixed on at least one surface of the second electrode collecting foil; and,
second electrode tabs, respectively protruding toward one side in the width direction, and provided at intervals along the longitudinal direction of the second electrode sheet,
the second electrode tab group comprises the second electrode tabs stacked at the second end face,
the collector has a first collector to be connected with the first electrode tab group, and a second collector to be connected with the second electrode tab group, and
at least any one of the first collector and the second collector has:
a first region part to be joined with the first electrode tab group or the second electrode tab group,
a second region part to be connected with the terminal, and
a third region part closer to the electrode body than the first region part, wherein
the first region part is directly joined with a first electrode tab in the first electrode tab group or with a second electrode tab in the second electrode tab group.

2. The secondary battery according to claim 1, wherein the third region part is arranged closer to the bottom wall than the first region part, and a step is provided between the first region part and the third region part.

3. The secondary battery according to claim 1, wherein the second region part is arranged closer to the sealing plate than the first region part, a step is provided between the second region part and the first region part, and the first region part is closer to the first sidewall than the second region part.

4. The secondary battery according to claim 1, wherein the third region part is in contact with the first end face or the second end face.

5. The secondary battery according to claim 1, wherein the third region part is closer to the electrode body than the second region part.

6. The secondary battery according to claim 1, wherein the collector includes an insulation layer on a surface on the electrode body side of the third region part.

7. A secondary battery, comprising:
an exterior body having a bottom wall, a pair of first sidewalls extending from the bottom wall and facing each other, a pair of second sidewalls extending from the bottom wall and facing each other, and an opening facing the bottom wall;
a sealing plate sealing the opening;
an electrode body accommodated in an inside of the exterior body, and including a first electrode sheet, and a second electrode sheet having a different polarity from that of the first electrode sheet;
a first electrode tab group provided at a first end face of the electrode body facing one of the pair of first sidewalls, and electrically connected with the first electrode sheet;
a second electrode tab group provided on a second end face of the electrode body facing the other of the pair of first sidewalls, and electrically connected with the second electrode sheet;
a terminal fixed at the sealing plate; and
a collector electrically connected with the terminal and the electrode body,
wherein
the collector has a first collector to be connected with the first electrode tab group, and a second collector to be connected with the second electrode tab group, and
at least any one of the first collector and the second collector has:
a first region part to be joined with the first electrode tab group or the second electrode tab group,
a second region part to be connected with the terminal, the second region part arranged above the first region part on the sealing plate side and
a projection-shaped third region part which is closer to the electrode body than the first region part, and projects from the second region part toward the electrode body, wherein
the first region part is directly joined with a first electrode tab in the first electrode tab group or with a second electrode tab in the second electrode tab group.

8. A secondary battery, comprising:
an exterior body having a bottom wall, a pair of first sidewalls extending from the bottom wall and facing each other, a pair of second sidewalls extending from the bottom wall and facing each other, and an opening facing the bottom wall;
a sealing plate sealing the opening;
an electrode body accommodated in an inside of the exterior body, and including a first electrode sheet, and a second electrode sheet having a different polarity from that of the first electrode sheet;
a first electrode tab group provided at a first end face of the electrode body facing one of the pair of first sidewalls, and electrically connected with the first electrode sheet;
a second electrode tab group provided on a second end face of the electrode body facing the other of the pair of first sidewalls, and electrically connected with the second electrode sheet;
a terminal fixed at the sealing plate; and
a collector electrically connected with the terminal and the electrode body,
wherein
the terminal comprises a collector connection part comprising:
an upper part arranged along an inner surface of the sealing plate; and
a lower part extending from the upper part toward the bottom wall side;

the collector has a first collector to be connected with the first electrode tab group, and a second collector to be connected with the second electrode tab group, and at least any one of the first collector and the second collector has:

a first region part to be joined with the first electrode tab group or the second electrode tab group;

a second region part to be connected with the terminal, the second region part arranged above the first region part on the sealing plate side; and a step part extending from an upper edge of the first region part on the sealing plate side to the electrode body; and the second region part
- extends from one end of the step part on the electrode body side to the sealing plate,
- is connected to a face on the lower part on the electrode body side, and
- is closer to the electrode body than the first region part, wherein the first region part is directly joined with a first electrode tab in the first electrode tab group or with a second electrode tab in the second electrode tab group.

9. The secondary battery according to claim 1, wherein the third region part is closer to the electrode body than the first region part, in a direction orthogonal to the first sidewall.

10. The secondary battery according to claim 7, wherein the third region part is closer to the electrode body than the first region part, in a direction orthogonal to the first sidewall.

\* \* \* \* \*